United States Patent
Muller et al.

(10) Patent No.: US 10,107,661 B2
(45) Date of Patent: Oct. 23, 2018

(54) THERMAL FLOWMETER WITH ENERGY STORAGE ELEMENT

(71) Applicant: Endress + Hauser Flowtec AG, Reinach (CH)

(72) Inventors: Harald Muller, Fulda (DE); Axel Pfau, Aesch (CH); Florian Krogmann, Wil (CH); Thomas Schonstein, Bilten (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 259 days.

(21) Appl. No.: 14/652,185

(22) PCT Filed: Nov. 25, 2013

(86) PCT No.: PCT/EP2013/074577
§ 371 (c)(1),
(2) Date: Jun. 15, 2015

(87) PCT Pub. No.: WO2014/090558
PCT Pub. Date: Jun. 19, 2014

(65) Prior Publication Data
US 2015/0308875 A1    Oct. 29, 2015

(30) Foreign Application Priority Data

Dec. 14, 2012 (DE) .................. 10 2012 112 315
Sep. 23, 2013 (DE) .................. 10 2013 110 487

(51) Int. Cl.
*G01F 1/692* (2006.01)
*G01F 1/696* (2006.01)

(52) U.S. Cl.
CPC .............. *G01F 1/692* (2013.01); *G01F 1/696* (2013.01)

(58) Field of Classification Search
None
See application file for complete search history.

(56) References Cited

U.S. PATENT DOCUMENTS 4,043,195 A * 8/1977 Hunting .................. G01F 1/684
                                                    702/47
4,693,115 A * 9/1987 Tokura .................... G01F 1/698
                                                    73/204.19
(Continued)

FOREIGN PATENT DOCUMENTS

DE       3115656 A1    11/1982
DE       3637497 A1     7/1987
(Continued)

OTHER PUBLICATIONS

English Translation of International Preliminary Report on Patentability, WIPO, Geneva, dated Jun. 25, 2015.
(Continued)

*Primary Examiner* — Daniel J Colilla
(74) *Attorney, Agent, or Firm* — Bacon & Thomas, PLLC (57) ABSTRACT

A thin-film sensor for a thermal flowmeter with at least a first substrate layer made of electrically non-conductive material, a second layer made of electrically conductive material and a cover layer to protect the resistance layer against abrasion, wherein the second layer is designed as two sensor elements, wherein at least a first of the two sensor elements is designed to introduce a heat quantity into a medium, and at least a second of the two sensor elements is designed to determine the ambient temperature, and the thin-film sensor has a gap that isolates the two sensor elements from one another.

15 Claims, 3 Drawing Sheets

(56) References Cited

U.S. PATENT DOCUMENTS

| | | | |
|---|---|---|---|
| 4,805,452 A * | 2/1989 | Eiermann | G01F 1/692 |
| | | | 73/202.5 |
| 4,821,568 A | 4/1989 | Kiske | |
| 4,918,995 A * | 4/1990 | Pearman | G01D 4/004 |
| | | | 73/204.11 |
| 5,207,765 A * | 5/1993 | Eiermann | G01F 1/684 |
| | | | 338/28 |
| 5,339,687 A | 8/1994 | Gimson et al. | |
| 5,375,466 A | 12/1994 | Konzelmann | |
| 5,635,635 A | 6/1997 | Tsukada et al. | |
| 5,780,173 A * | 7/1998 | Harrington | B82Y 15/00 |
| | | | 205/170 |
| 6,453,739 B1 | 9/2002 | Salkalis et al. | |
| 6,550,324 B1 | 4/2003 | Mayer et al. | |
| 6,628,202 B2 * | 9/2003 | McQueen | G01F 1/684 |
| | | | 340/603 |
| 7,963,162 B2 | 6/2011 | Muziol et al. | |
| 2002/0023486 A1 | 2/2002 | Watanabe et al. | |
| 2005/0081621 A1 * | 4/2005 | Zobel | G01F 1/698 |
| | | | 73/204.26 |
| 2005/0261842 A1 | 11/2005 | Yamagishi et al. | |
| 2011/0030468 A1 | 2/2011 | Chen et al. | |

FOREIGN PATENT DOCUMENTS

| | | |
|---|---|---|
| DE | 3639666 A1 | 6/1988 |
| DE | 4308227 A1 | 9/1994 |
| DE | 69011099 T2 | 12/1994 |
| DE | 19939942 A1 | 3/2001 |
| DE | 10202210 A1 | 8/2003 |
| DE | 102004038988 B3 | 1/2006 |
| DE | 102005057689 A1 | 6/2007 |
| DE | 102006058425 A1 | 6/2008 |
| DE | 102008032300 A1 | 1/2010 |
| DE | 102008037206 A1 | 3/2010 |
| DE | 102010042307 A1 | 4/2012 |
| EP | 1083411 | 3/2001 |
| JP | 04001528 A * | 1/1992 |
| WO | 0120269 A1 | 3/2001 |

OTHER PUBLICATIONS

International Search Report EPO,, The Netherlands, dated Apr. 14, 2014.

German Search Report, German PTO, Munich, dated May 15, 2013.

German Search Report, German PTO, Munich, dated Feb. 3, 2014.

* cited by examiner

THERMAL FLOWMETER WITH ENERGY STORAGE ELEMENT

TECHNICAL FIELD

The invention concerns a thermal flowmeter, as well as a procedure for determining and/or monitoring a thermal mass flow, and a procedure for the calibration of such a thermal flowmeter

BACKGROUND DISCUSSION

Sensors are known for flowmeters that operate according to the thermal measuring principle. This measuring principle is based on the cooling of a heated sensor element, hereinafter also referred to as the heating or active sensor element, from which heat is taken by the medium flowing past the element. The energy removed is offset again by increasing the electrical heating current. This gives rise to a constant temperature difference between the heating sensor element and an available reference temperature sensor, hereinafter also referred to as the measuring or passive sensor element. The greater the mass flow, the more energy required to maintain this difference. Consequently the measured heating current is proportional to the mass flow. The thermal measuring principle is well established in process engineering and is successfully deployed in a wide range of applications. The application of the measuring principle is particularly challenging in water and other liquids, such as oil for instance, as the transfer of heat and the necessary heating power are considerably higher here compared to gases.

Furthermore, thermal flowrate measuring sensors based on thin-film elements are known, such as those manufactured by IST-AG.

SUMMARY OF THE INVENTION

The problem addressed by the present invention can be considered that of producing a thin-film sensor and a thermal flowmeter which have good response behavior, i.e. detect a temperature change in as short a time as possible.

Furthermore, the aim is to present a procedure for the low-energy operation of the aforementioned flowmeter.

In accordance with the invention, a thin-film sensor for a thermal flowmeter has at least a first substrate layer made of electrically non-conductive material, a second or resistance layer made of electrically conductive material and a cover layer to protect the resistance layer against abrasion, wherein the second or resistance layer comprises two sensor elements, wherein at least a first of the two sensor elements is designed to introduce a heat quantity Q1 into a medium, and at least a second of the two sensor elements is designed to determine the temperature of the medium, and the thin-film sensor has a gap that isolates the two sensor elements from one another.

As a result of the isolation, here both electrical isolation and, in particular, thermal insulation of the two sensor elements, a temperature difference between the two sensor elements arises more quickly and can be determined more quickly.

It is advantageous if the cover layer has a layer thickness between 0.1 μm-20 μm.

Favorable isolation of the sensor elements is achieved if the gap has a gap width of at least 3%, particularly at least 5% of the total width of the thin-film sensor.

It is advantageous if the gap depth of the gap is between 70% and less than 120% of the total length of a sensor element (5 or 6), but less than 90%, preferably less than 80%, of the total length (L1) of the thin-film sensor, particularly of the total length of the substrate layer (2).

The sensor elements may advantageously comprise a trim loop for trimming the resistance value.

It is advantageous if the thin-film sensor has an essentially mirror symmetrical shape, wherein the mirror plane runs along a central axis of the gap. As a result of the symmetrical design, each of the two sensor elements can independently take over the function of the other sensor element. Therefore, even if the connections are mixed up, the function is guaranteed and alternate heating operation is possible.

In accordance with the invention, a thermal flowmeter for determining and/or monitoring a thermal mass flow of a medium through a measuring tube has a thin-film sensor as claimed in one of the claims 1-6. Thanks to the quick response time and the sensor's very direct transfer of heat and temperature, the energy balance of the flowmeter can be optimized and energy consumption can be reduced.

A particularly advantageous low-energy operation of the thermal flowmeter can be accomplished to the extent that the flowmeter has an energy storage element and a control and/or regulation unit for the clocked supply of power to the heatable sensor element in such a way that through the sensor i) a heat quantity is introduced into the medium at intervals, with interval pauses $t_0$ in which no heat quantity is introduced into the medium and heating intervals $t_1$ in which quantities of heat are introduced into the medium, and wherein ii) the interval pauses to last longer than the heating intervals $t_1$ It is also advantageous if the thin-layer sensor is enclosed in a base, preferably a ceramic base, for arrangement on or in a housing of a thermal flowmeter. This reduces the danger of breaking the thin-film sensor when inserting it into the housing as the base is provided as a fastening surface.

Furthermore it is also advantageous if a connection layer, preferably made of enamel, is arranged between the base and the thin-film sensor. This guarantees a permanent connection to the base.

Wires are integrated in the base to supply power to the thin-film sensor and/or for the signal transmission of values measured by the thin-film sensor. Here, the base guarantees strain relief of these wires and prevents unintentional separation from the thin-film sensor.

To prevent the penetration of the medium into the housing of the flowmeter and therefore corrosion of the electronics, a connection layer is arranged between the base and the housing for the tight connection between the base and the housing.

The base can be arranged in a detachable axial locking mechanism on or in the housing. This has the advantage that the thin-film sensor can be replaced in the event of damage.

In accordance with the invention, the method for determining and/or monitoring a thermal mass flow of a medium through a measuring tube with a thermal flowmeter, comprises a thin-film sensor with at least a first heatable sensor element and an energy storage element for the provision of power to the sensor element, wherein the energy storage unit saves energy fed in and releases an amount of energy to the sensor element over a time frame, wherein the amount of energy released is larger than the amount of energy fed in during this time frame.

This mode of operation allows a thermal flowmeter to be operated with low continuous feed-in power.

BRIEF DESCRIPTION OF THE DRAWINGS

One sample embodiment in accordance with the invention is described in greater detail below using the following graphics.

DETAILED DISCUSSION IN CONJUNCTION WITH THE DRAWINGS

Conventional thermal flowmeters usually use two heatable sensor elements, which are identical in design if possible, and which are in thermal contact with the medium flowing through a measuring tube or the pipe. For industrial applications, both sensor elements are integrated together as one element in a thin-film element, for example in a plastic compound. Here, the thin-film element has a maximum thickness of 2 mm. One of the two sensor elements is an active sensor element which is heated by means of a heating unit. Either an additional resistance heater is provided as the heating unit, or the sensor element itself is a resistance element, e.g RTD sensor (Resistance Temperature Device), which is heated by the conversion of an electrical power, e.g. by an appropriate variation of the measuring current. The second sensor element is a passive sensor element: it measures the temperature of the medium.

Usually in a thermal flowmeter a heatable sensor element is heated in such a way that a fixed temperature difference arises between the two sensor elements. Alternatively, the feeding in of a constant heating power via a control/regulation unit is also known.

If there is no flow in the measuring tube, a quantity of heat which is constant over time is required to maintain the specified temperature difference. If, on the other hand, the medium under measurement is in motion, the cooling of the heated sensor element is primarily dependent on the mass flow of medium flowing by. As the medium is colder than the heated sensor element, the medium flowing by takes heat away from the heated sensor element. Therefore, to maintain the fixed temperature difference between the two sensor elements if a medium is flowing, a higher heating power is required for the heated sensor element. The higher heating power is an indicator of the mass flow or the mass flow rate of the medium through the pipe.

If, on the other hand, a constant heating power is fed in, the temperature difference between the two sensor elements is reduced as a result of the medium flow. The temperature difference is then an indicator of the mass flow of the medium through the pipe or through the measuring tube.

Therefore there is a functional correlation between the heat energy required to heat the sensor element and the mass flow through a pipe or a measuring tube. The dependency of the heat transfer coefficient on the mass flow of the medium through the measuring tube or through the pipe is used in thermal flowmeters to determine the mass flow.

With regard to the temperature of the thermal mass flow, a thermal flowmeter can reach a maximum power limit when measuring liquids.

Figure 1:
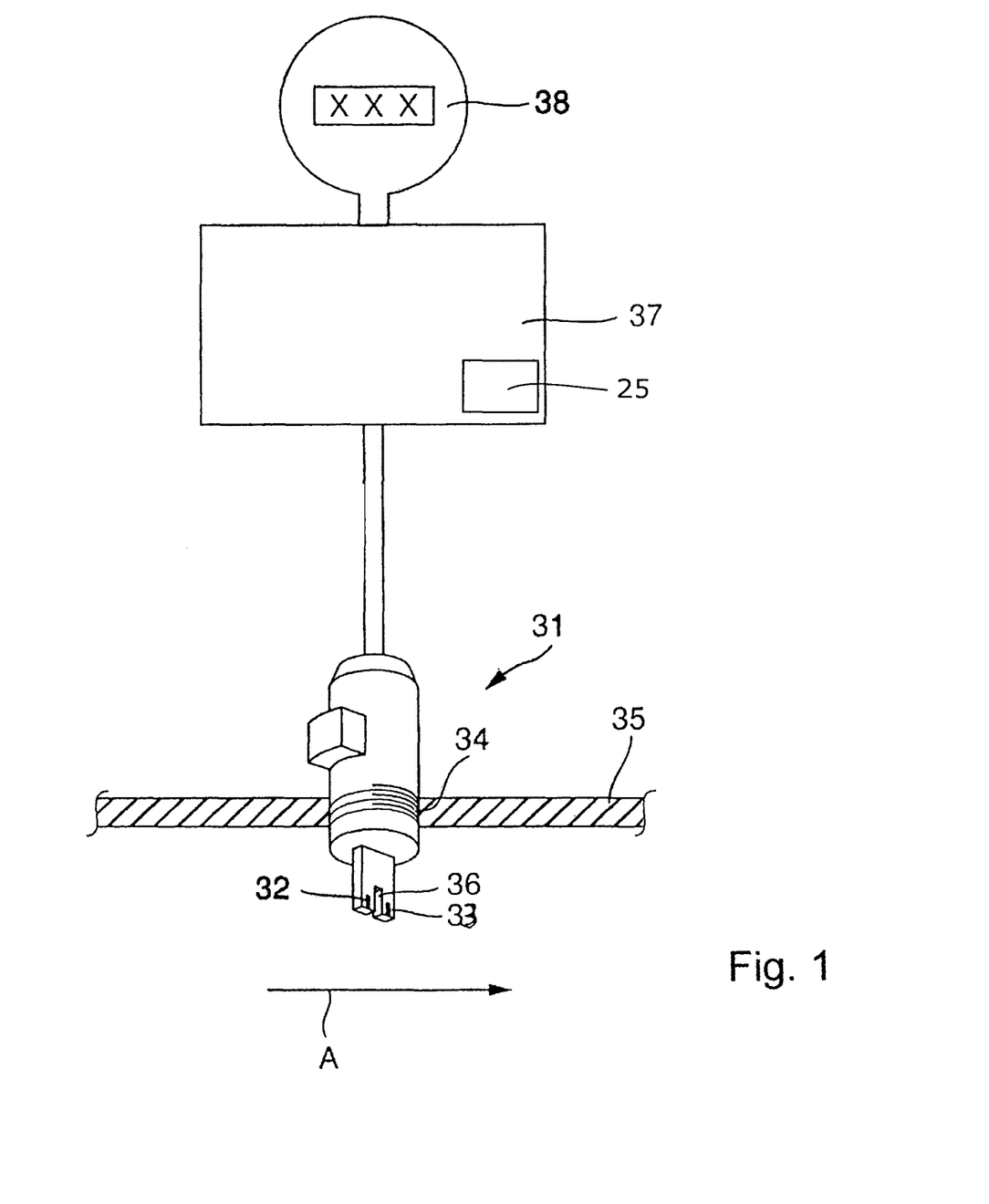
FIG. 1 shows a sectional side view of a thin-film sensor as claimed in the invention.
Figure 2:
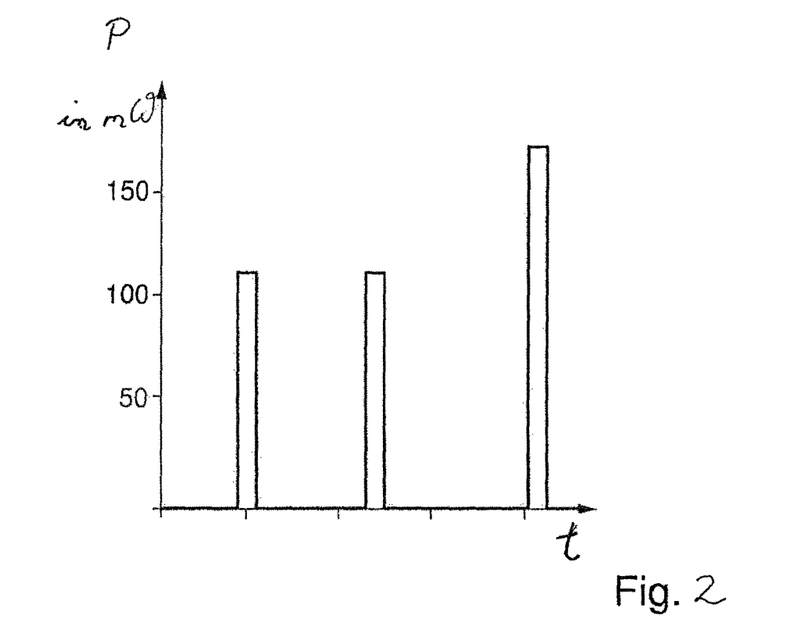
FIG. 2 shows a sectional front view of a thin-film sensor as claimed in the invention.

FIGS. 1 and 2 illustrate a thin-film sensor 1 as can be installed in a thermal flowmeter in accordance with the invention.

In its simplest design, this thin-film sensor 1 has three layers. Starting with a ceramic substrate layer 2 of any thickness, a resistance layer 3 is applied. The thickness of a substrate layer can typically be between 250 and 800 μm. However, considerably thicker or thinner substrate layers are also possible. Due to the low heat conductivity coefficient, the substrate layer can preferably be made of aluminum oxide or of zirconium oxide or at least contain over 50% zirconium oxide in weight. The resistance layer can be made of platinum whose electrical resistance is linearly dependent on the temperature. The distinguishing feature of this resistance layer is in its application, which is performed according to what is known as the thin-film process.

Thin-layer or thin-film sensors are set terms in sensor technology. Usually in a thin-film process, layers ranging from atomic size to up to approx. 5 μm thick are deposited on the surface of a substrate. This is performed either as deposition under vacuum or within a defined atmosphere, e.g. within an inert gas atmosphere like argon. The medium to be deposited, here platinum for example, is typically deposited onto the surface via sputter deposition, vaporization or chemical gas phase reactions.

In this way the resistance layer 3 on the substrate 2 is preferably less than 5 μm thick. The thin-film sensor has a plate-like structure and is split into a first lower plate segment 14, and into a first and a second upper plate segment 12 and 13. The two upper plate segments are essentially the same size and shape and are separated from one another via a gap 11. In FIG. 2, they are rectangular in shape but can also adopt a square shape depending on the depth of the gap. The lower plate segment 14 is responsible for the integrity of the thin-film sensor, i.e. the gap 11 does not extend into this plate segment. The resistance layer 3 is designed as a first and a second rectangular sensor element, which are designed, in particular, as resistance elements 5 and 6 in FIG. 1-4, on the substrate 2. The material of the resistance elements can be platinum or a material which is technically equivalent to platinum. The resistance elements comprise a trim loop 5a, 6a to trim the specific resistance value. Other shapes, for example oval or triangular, are also possible but the rectangular shape permits the greatest possible contact surface with the medium under measurement. In FIG. 2 it is evident that in each case one of the resistance elements 5 or 6 is arranged exclusively in one of the upper plate segments 12 or 13 in each case and does not extend into the lower plate segment 14. In addition to gap 11, this enables the better thermal decoupling of the two resistance elements 5 and 6 from one another. At least two connecting cables 7a, 7b and 8a, 8b for the supply of power to the resistance elements lead from each resistance element 5 and 6. Said connecting cables can preferably also be deposited on the substrate in the thin film process. Alternatively, the connecting cables can also be soldered onto the resistance elements or be connected in another way. However, this version is less preferable as the solder can become loose or could influence the measurement due to uneven distribution on the resistance element. With regard to their conducting path width, the connecting cables can be varied to the appropriate current carrying capacity in the operating temperature range.

The precisely four connecting cables 7a, 7b, 8a, 8b end in precisely four contact points in total 9a, 9b, 10a, 10b, which enable the connection of a' current carrying cable. Due to the connection cables, the contact points are at a sufficient distance from the resistance elements in order not to, or only marginally, affect the measurement and the heating of the medium by the resistance elements 5 or 6. In certain embodiments of the sensor, more than or fewer than four connecting cables and contact points can be provided. Comment: The IST flow sensor has three connections—the middle two are designed as one connection.

The particular resistance element 5 or 6 does not, however, extend over the entire width of the individual plate segment 12 or 13. Therefore the plate segments 12, 13 and 14 have peripheral areas 16, which are not covered by the first or second resistance element.

This resistance layer 3 or the resistance elements 5 or 6 are relatively at risk from chemical or mechanical corrosion—such as abrasion from flow particles or oxidation effects from the medium under measurement—due to the thinness of the layer. Therefore the resistance layer 3 has an additional cover layer 4. This cover layer is made of glass with a length expansion coefficient that is adapted to the substrate. It has the advantage that a material connection between cover layer 4 and substrate 2 in the peripheral areas 16 results in a material finish which is particularly resistant to temperature change on account of the same temperature expansion coefficients of the two layers, and temperature stress in the material can be avoided. Alternatively or additionally hard material can be added to the material of the cover layer, in particular, or also to the substrate where necessary, which increases the mechanical resistance of the material. Known hard materials are carbide, nitride and/or silicide which are preferably added to the material in concentrations of up to 10% in weight.

The use of cover layers against abrasion and the like may already be known from other areas of application. The particularity of the cover layer 4 of the thin-film sensor, however, is that a compromise must be found between the material thickness to prevent mechanical abrasion and the thermal conductivity. It is generally the case that a cover layer of several 100 μm reliably protects a resistance element against abrasion. However, such a cover layer would seriously prevent heat input from the resistance element 5 or 6 into the medium which would result in very long sensor response times. Therefore the cover layer should be less than 10 μm, preferably less than 5 μm, and particularly less than 2 μm. While layer thicknesses of 2-10 μm can still be implemented, a layer thickness of less than 2 μm has proven to be particularly favorable. The thickness of the cover layer 4 can vary depending on the field of application. However, it should not drop below a layer thickness of 10 nm where possible.

A primary feature of the thin-film sensor 1 is the gap 11, which divides the thin-film sensor 1 into the two aforementioned upper plate segments 12 and 13. Up to now, thin-film sensors have mostly had a plate-like design. An additional segmentation step with the introduction of the gap 11 into the thin-film sensor 1 and the associated manufacturing effort results in considerable advantages when the thin-film sensor is used in a thermal flowmeter. The gap has an isolation purpose and serves the thermal decoupling of the two resistance elements 5 and 6 from one another. The gap preferably has a gap width S3 of at least 3%, particularly at least 5% of the total width of the thin-film sensor 1. The width S1 or S2 of the first or second upper plate segment 12 or 13 is therefore preferably 48.5% at maximum, particularly 47.5% at maximum of the total width S0 of the thin-film sensor. The gap depth L2 of the gap 11 is preferably between 70% and less than 120% of the total length of a resistance element 5 or 6, but less than 90% of the total length L1 of the thin-film sensor, wherein the total length of the resistance element 5 or 6, the total length L1 of the thin-film sensor 1 and the gap depth L2 have the same direction of orientation. These gap depths enable a particularly good thermal decoupling of the resistance elements on the one hand and, on the other hand—due to the maximum gap depth—they reduce further material weakening and therefore the danger of the thin-film sensor 1 breaking in the longitudinal direction in the extension of gap 11.

Figure 3:
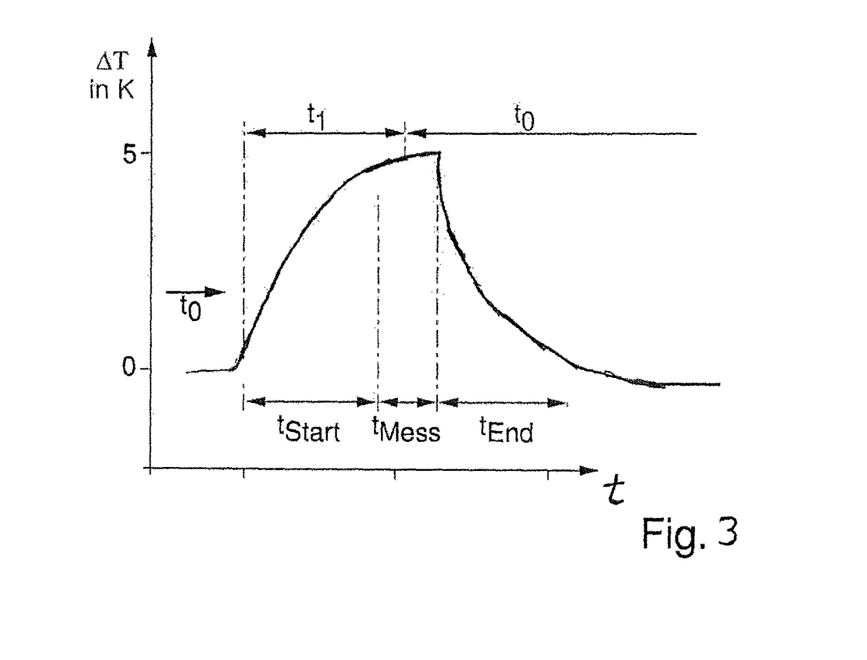
FIG. 3 shows a side view of a thermal flowmeter as claimed in the invention.
Figure 4:
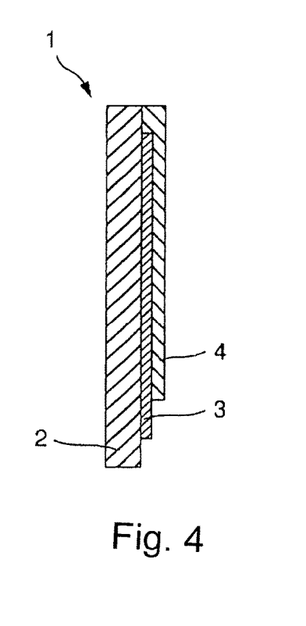
FIG. 4 shows a front view of a thermal flowmeter as claimed in the invention.

FIGS. 3 and 4 illustrate the installation position of the thin-film sensor 1 in a thermal flowmeter 22.

The thin-film sensor 1 is set in a ceramic base 21 in the area of the lower first plate segment 14 into which the gap 11 does not extend. The ceramic base 21 is inserted into a protective pipe 22. Many versions of securing the base 21 in the protective pipe 22 are conceivable. Of these only one version is illustrated in FIGS. 3 and 4. Here, the inner wall of the protective pipe 22 has a projection 18 which extends radially from the inner wall in the direction of the pipe axis. This projection 18 is circular around the circumference and acts as a bearing surface of the base 21 in the protective pipe 22. To the extent that the base 21 is arranged in the protective pipe 22, the protective pipe forms an internal space 17, which is closed at least on one side, in which cables 20 are arranged to supply the thin-film sensor 1 with power and to transmit the measuring signals. A connecting layer 24, particularly a sealing element, is arranged between the protective pipe 22 and the base 21 preventing the penetration of the medium into the internal space 17. This sealing element can, for example, be an O-ring made from a chemically and thermally resistant material, such as a Teflon ring—which, for example, also withstands THF vapors and continuous service temperatures of up to 260° C. The connecting layer 24 can, however, also be metallic or ceramic in nature, such as a metal solder. A ring-shaped locking mechanism is provided in FIG. 2 to position the base 21 in the protective pipe 22 in the axial direction. This ring-shaped locking mechanism 19 can be fixed on the protective pipe using known fastening mechanisms, preferably in a detachable manner by screwing, clamping or latching in place, or in a permanent manner by welding or soldering.

While both resistance elements 5 and 6 can, in principle, be heated one of the resistance elements acts as a passive element to determine a first medium temperature and the second of the resistance elements acts as an active element to introduce a quantity of heat into the medium and to determine a second medium temperature after the quantity of heat has been introduced.

Overall, the thin-film sensor is suitable for the measurement of media at process temperatures of over 200° C., preferably over 250° C., at which welded sensors mostly reach their limits.

Preferable measuring ranges of the thin-film sensor are 1 to 240 kg/m²s. Preferable pressure ranges of the thin-film sensor are 1 to 40 bar.

Other parts of the thermal flow sensor are not illustrated in greater detail in FIGS. 3 & 4.

The following section provides a detailed description of a procedure for the production of the thermal flowmeter, as illustrated in FIGS. 3 and 4.

A first step involves the preparation of a plate-like thin-film sensor. This preparation comprises the usual production process according to thin-film technology. Here, a ceramic substrate 2 is first provided in a chamber. This chamber is evacuated and can then, if necessary, be flooded with a defined atmosphere or can be operated further in the evacuated state. A resistance layer 3 is applied through vaporisation, sputter deposition application and/or the chemical formation of the specific component in the steam phase, which is then deposited on the surface of the substrate. The thickness of the layer can vary between an atomic layer and a layer up to approx. 5 μm in thickness. These sensors can be produced as wafers. Afterwards, the cover material, preferably a ceramic cover material 4, can be applied in an additional production step. Printing or baking are preferred production steps. Such production techniques are known from ceramic production and can be advantageously applied to the production of thin-film sensors. Following the preparation of the thin-film sensor, the result is a sensor with a rectangular surface. Two resistance elements which are essentially identical in shape are arranged on the thin-film sensor.

A second step involves the introduction of a gap 11 into this thin-film sensor by dividing the thin-film sensor into at least sub-sections of the same dimension on which a resistance element is partly or fully arranged in each case. The arrangement of the particular resistance element on the subsegment of the thin-film sensor is preferably essentially identical to every other subsegment. The gap can preferably be introduced by laser since a laser cut is very precise. Another, but less favorable, option is the introduction of the gap 11 with the use of a ceramic saw.

A third step involves the connection of power supply and signal transmission cables 20 of an electronic component of a thermal flowmeter 23 with the thin-film sensor 1 at contact points 9a, 9b, 10a, 10b which are specifically provided for this and arranged on the thin-film sensor.

In an optional fourth step the thin-film sensor can be set in a ceramic base 21. This base is used on the one hand to additionally secure the power supply and signal transmission cables 20 and on the other hand offers a fixing point for mounting the thin-film sensor in a housing. The thin-film sensor 1 is connected to the base 21 preferably through melting with a low-melt enamel.

A fifth step involves the positioning of the thin-film sensor in the housing of a thermal flowmeter in such a way that the thin-film sensor projects, at least in part, out of the housing. The housing can preferably have a cylindrical form with a housing axis, whereby the thin-film sensor can be locked in the axial direction of the housing.

After this, all the connection points and the entire sensor structure can be checked to ensure it is leak-tight. This can be performed with gas leak-tightness tests as are known from the area of housing design and construction.

Figure 5:
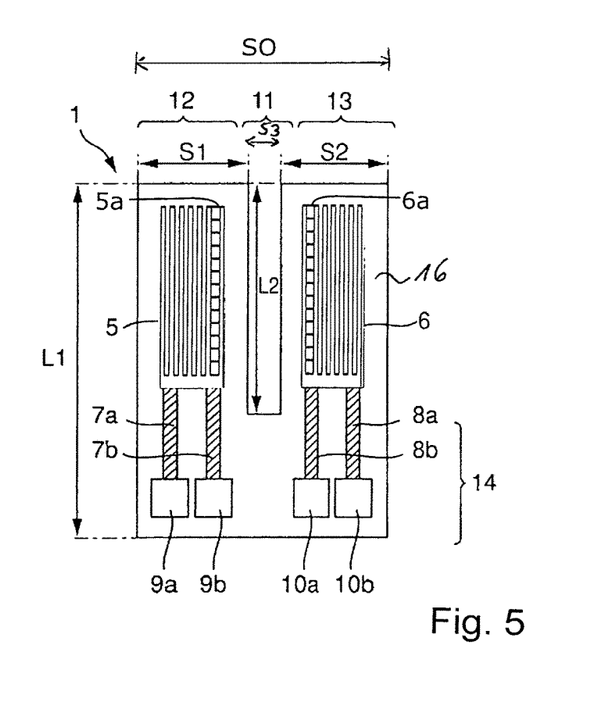
FIG. 5 shows a view of a flowmeter as claimed in the invention.
Figure 6:
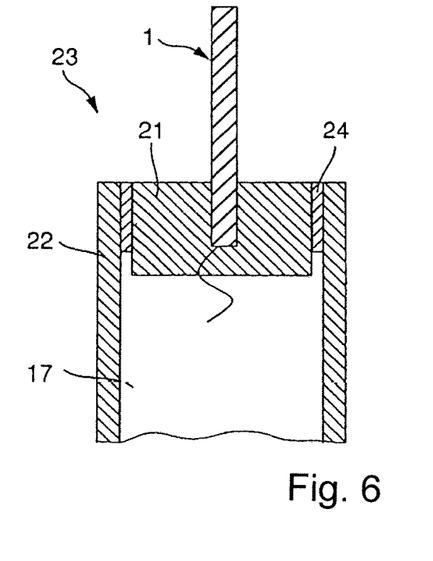
FIG. 6 shows an idealized energy profile over time.

An example of how optional components of the thermal flow sensor can be added is illustrated in FIG. 5. This concerns, inter alia, a control and/or regulation unit 37 and an evaluation and/or display unit 38. In FIG. 5 these are functionally separated from one another but can, alternatively, be implemented together in one component such as a microprocessor.

As can be seen from FIG. 5, the thin-film sensor is directly exposed to the medium.

A thin-film sensor, like that illustrated in FIG. 5, is particularly suitable for two-wire technology. This technology is based on low-power power supply. Typically in two-wire devices, only a limited power is available to the meter electronics. Systems, such as the microprocessor or microcontroller and the thermal flow sensor must be operated by this power. Therefore, with continuous energy supply 5-10 mW is provided as pure heating power. With such power, a sensor with a power coefficient of 5 mW/K and a heating surface of $1.5*1.5$ mm$^2$ can only be heated to a overtemperature of 1-2K in relation to the medium temperature. Usually the overtemperature is around 7-10 K in the thermal flow range. The overtemperature can be improved by miniaturization and the better thermal insulation between the active and passive sensor element. A sensor with a heating surface of $1*1$ mm$^2$ achieves a power coefficient of 2.2 mW/K. with the same flow as in the previous example. Therefore, continuous heating operation would result in a temperature difference of between 2 and 4.5 K, wherein as a result of the thermal insulation of the sensor according to the invention the power coefficient can be reduced further and the temperature difference increased further. Therefore, to be used in two-wire technology the thin-film sensor according to the invention should optimally be operated with a process described in the following section.

A preferred energy storage unit, which can be provided at various locations in the thermal flowmeter, is not illustrated in FIG. 5.

FIG. 5 shows a sensor of a thermal flowmeter which is designed as a thermal mass flow sensor 31.

Thin-layer or thin-film sensors are set terms in sensor technology. Here, usually layers ranging from atomic size to up to approx. 5 μm thick are deposited on the surface of a substrate. This is performed either as deposition under vacuum or within a defined atmosphere, e.g. within an inert gas atmosphere like argon. The medium to be deposited is typically deposited onto the surface via sputter deposition, vaporization or chemical gas phase reactions.

FIG. 5 shows a thermal flowmeter 31 with a flowmeter element 36 which has a thin-film sensor. This flowmeter element 36 is arranged on the wall 35 of a measuring tube in such a way that the thin-film sensor projects into the measuring tube and is in direct contact with the medium. An O-ring 34 can prevent the release of the medium at the point of deployment of the flowmeter element in the measuring tube.

The figure illustrates a first passive sensor element 32 for determining a first medium temperature and an active service element 33 which feeds a heating power into the medium. In FIG. 1-4 these are designed as resistance elements and are usually covered by a cover layer to protect against abrasion.

The flowmeter element 36 has an essentially cylindrical device body and a rectangular sensor tip, the thin-film sensor 1. The sensor elements 32 and 33 are arranged on or in this sensor tip. Two wires, which are connected to a control unit 37, lead away from the flowmeter element. A display unit 38 is arranged on this control and/or regulation unit 37. The embodiment illustrated in FIG. 5 is obviously only an example and other design versions are similarly conceivable within the context of the invention. An energy storage unit, with an energy storage element 25 is arranged in FIG. 5, in the control and/or regulation unit 37. The energy storage element 25 can of course also be arranged either in the flowmeter element 31 itself, or in the display unit 38.

On account of the thinness of the material, the thermal flow measuring sensors that are designed as thin-film elements or thin-layer elements are characterized by favorable temperature and signal transmission between the active sensor element and the medium as well as between the passive sensor elements and the medium. This favorable temperature transfer results in a particularly good response behavior of the thin-film element.

Ideally, with the supply of power to a thermal flowmeter in general, and to a thermal flowmeter with a thin-film sensor in particular, it is possible to implement a sensor with a low energy demand at a power of around 43 to 540 mW.

The case illustrated preferably refers to a two-wire flowmeter wherein the power supply line and the fieldbus line are switched together on one wire, such that only a twin-core wire is needed to supply energy to the flowmeter 31 and simultaneously permit communication with a remote control center.

The low power requirement can be implemented by a regulation and/or control unit that is not illustrated here in greater detail in such a way that the active sensor element, i.e. the heating device, is only provided with power at intervals.

As a result of the pulsed supply of power heat is also only entered into the medium by the heating element in a pulsed manner. The flowmeter preferably has an energy storage unit, for example a capacitance energy storage unit like a capacitor or inductive energy storage unit. This energy storage unit enables a sufficient supply of power to the thin-film sensor such that quantifiable and detectable heat input takes place, allowing flow measurement according to the thermal principle.

The system can be controlled in a variety of ways. Given a constant supply of energy to the energy storage unit, the energy storage unit can release the stored energy in a specific time frame if a target value is exceeded and therefore supply more energy to the medium during this time frame than would be possible without the energy storage unit. This input of energy can continue until the energy storage unit is empty.

Alternatively the active sensor element can also be supplied with a specific energy amount within a specified time frame.

With regard to the amount of energy, the following control system has proven to be particularly favorable:
 a) Introduction of a first quantity of heat into a flowing medium by the active sensor element;
 b) Determination of a first mass flow value or a variable proportional to this according to the principle of thermal flow measurement, and
 c) Introduction of a second quantity of heat by the active sensor element, wherein the second heat amount depends on said first mass flow value or the variable proportional to this.

If the energy stored suffices to provide an appropriate amount of energy, the energy amount and therefore also the quantity of heat introduced into the medium can be adapted to the mass flow of the medium. As a result, a sufficient temperature difference is always achieved to determine a mass flow even if a small amount of energy is available.

In the case of the pulsed supply of power to the active element, under certain circumstances a constant temperature might not materialize at a constant mass flow, or a constant temperature difference might not arise.

Figure 7:
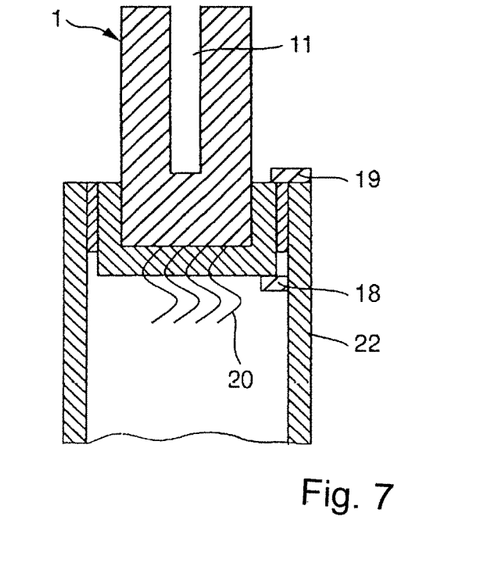
FIG. 7 shows a temperature profile with pulsed power supply.

A schematic pattern of the temperature difference between the two sensor elements 32 and 33 is illustrated in FIG. 7. The temperature curve has a preheat time $t_{start}$ in which the supply of power heats up the active sensor element with a definite amount of energy.

The time interval $t_{Mess}$ that follows the preheat time characterizes the period in which a temperature measurement takes place. In this period, the maximum amount of power is supplied to the active sensor element or is already exceeded. The temperature difference pattern in this interval preferably has the form of an exponential function. While it is desirable to have as constant a temperature difference as possible in the measuring interval range, a suitable calibration can advantageously compensate for the exponential form during the measurement.

Therefore, for example, it is possible to perform a flowmeter calibration in relation to air and, on the basis of this calibration, compensate the exponential form particularly for the measurement of gases and gas mixtures with approximately the same specific heat storage capacity as air.

Furthermore, the specific heat storage capacity of the sensor elements and the sensor material can be taken into consideration in the calibration.

The power that is available to the system is minimal, totaling around 43 mW, with a terminal voltage of 12 V.

To ensure that the heat input behavior is as constant as possible during the measuring window, it is advantageous if the energy input adopts a constant value at a maximum temperature difference of 10 K. The excess power can be saved and used, for example, for the display and/or the warning signaler.

Available excess energy can also be used to prolong the signal duration or signal evaluation.

FIG. 1 only depicts one sample embodiment of a sensor of a thermal flowmeter. The typical terminal voltage of such a flowmeter is nominally 12 V.

In a second sample embodiment, the active sensor element can be switched to a passive sensor element following the input of heat.

In a third sample embodiment, the second passive sensor element determines the temperature of the active sensor element to track the drop in temperature within the measuring window. A compensation factor can be determined for the measurement with this auto-calibration.

The Pt 100 sensor elements are known sensor elements. However, it is preferable to use a nickel/chromium element which is meander-shaped and has an essentially constant resistance at temperatures between 0-150° C., preferably 5-120° C., and particularly preferably 10-90° C.

A preferred calibration of the aforementioned thin-film sensor preferably takes place in two stages.

To determine the temperature dependency of the resistance of the sensor element, a temperature characteristic curve is recorded as the calibration in a first step, said curve saving the specific resistance of the sensor element at different temperatures in the form of measurement data.

Then, a specific mass flow [kg/m²s] and the associated power coefficient [W/K] is recorded in a second step. These data are logged several times to confirm the repeatability of the measurement.

In a further embodiment of the invention, a flowmeter with time division control of the active sensor element is possible as a result of the pulsed supply of power. Here, the sensor consists of a passive sensor element to determine the medium temperature and an active sensor element.

The active sensor element can preferably switch between temperature measurement and power measurement and is supplied with power on a pulsed basis.

With time-division control of the sensor element, it is possible to implement several operational states of a sensor element one after the other.

The medium temperature is determined in a first operational state of the sensor element. The energy storage unit can load energy during this state.

After this, the sensor element switches to a second operational state. Here, the energy storage unit supplies energy to the sensor element. As a result, a quantity of heat is given off to the medium and a temperature profile is formed in accordance with the flow profile of the medium. The energy storage unit is discharged during this time.

In a third operational state, the sensor element can determine its temperature after the energy is introduced.

To implement these three operational states, a short-as-possible time frame is required which can be implemented in particular at higher flow rates, for example those exceeding 2.5 m/s.

It is particularly preferable that the device can support the common two-wire interfaces of the process industry. This concerns HART, Profibus PA and Foundation Fieldbus FF in particular.

In addition, the flowmeter can be used in both standard areas and in hazardous areas in industrial processing measuring technology and automation. In particular, the flowmeter can be equipped according to the Namur standard.

Alternatively, or in addition to a heating unit as an active sensor element, the active sensor element can also be designed as a light source, particularly an infrared source. With this type of pulsed heat input, the response time of the light source is also very short such that the quantity of heat can be introduced and a temperature curve formed within the measurement period.

The parameters to operate the thermal flowmeter (pulse duration/pulse pause) are controlled depending on the flow previously determined in conjunction with the supply voltage and/or customized modifications where necessary.

If necessary, power can additionally be supplied to the sensor for measurement purposes via an additional two-wire connection. As a result, a higher temperature difference can occur between the sensor elements, allowing for a more accurate measurement.

To the extent that the sensor elements 32 and 33 can each be heated, the sensor elements can be heated alternately in another embodiment.

Preferably, the thermal flowmeter in accordance with the invention and as described above has an energy storage element and a control and/or regulation unit for the clocked supply of energy to the heatable sensor element in such a way that the sensor introduces a heat quantity into the medium at intervals, with interval pauses $t_0$ in which no heat quantity is introduced into the medium and heating intervals $t_1$ in which the heat quantities are introduced into the medium, and wherein the interval pauses $t_0$ last longer than the heating intervals $t_1$.

A heatable sensor element can, for example, be a heater unit with a temperature sensor or a heatable resistance temperature detector. The heater unit can, for example, be a heating wire or a light source, particularly an infrared source. However, other heatable sensor elements that are able to introduce a quantity of heat into a medium are also conceivable for the application.

With the special system of controlling energy storage and energy release, it is possible to implement a particularly low-energy operation of the thermal flowmeter.

It is particularly advantageous if the sensor is designed as a thin-film sensor. As it is designed as a thin-film sensor, the sensor responds quickly to temperature changes. This means that the heat is transferred relatively quickly to the medium so that the time frame for heat entry can be kept short. As a result of the energy storage unit, energy can be temporarily stored in the event of low energy supply and be released to the heatable sensor element as an energy package within the short heating period. Thanks to the short-term power peak and the good response behavior, a temperature profile can be created in the shortest time possible, said temperature profile being dependent on the mass flow or a variable that is proportional to the mass flow. This temperature profile can be detected and evaluated.

The energy storage element can be advantageously supplied with a constant energy or power supply as low as 43 mW±1 mW.±1 mW indicates the variation of the power. A considerably higher level of energy can, of course, also be supplied to the energy storage element but the functional integrity of the flowmeter is still guaranteed at such a low level of continuous power supply.

It is advantageous if the energy storage element is equipped to provide the flowmeter with a power of over 44 mW during a heating interval $t_1$ if the power supply to the flowmeter is 43±1 mW during said heating interval.

It is advantageous if the control and/or regulation unit is designed in such a way that the first heatable sensor element can be operated in at least two operating modes, wherein an evaluation unit is provided which determines a power consumption in a first operating mode of the sensor element and determines a temperature in a second operating mode of the sensor element. In this way, it is possible to save on a sensor element for determining the heatable sensor element.

To enable an even faster response behavior on the part of the sensor and to prevent energy loss caused by thermal conduction through contact media, particularly the wall of the measuring tube, the sensor is arranged in the measuring tube in such a way that it is in contact with the medium.

If the sensor is positioned on the measuring tube wall, and is common in the case of several thin-film sensors, the measurement of the mass flow can be disturbed by the effects of turbulence. In certain circumstances, this can result in the limitation of the thermal flowmeter to a more restricted measuring range. If the sensor is placed in the optimum position, it projects into the flow of medium. Therefore, presuming that the measuring tube inner wall runs towards the measuring tube axis, it is advantageous if the sensor projects into the medium by at least 5 mm and preferably by at least 2 cm.

It is advantageous if the thermal flowmeter has at least a second sensor element for determining the medium temperature when a quantity of heat is introduced into the medium by the first heatable sensor element. While the first heatable sensor element can also determine the medium temperature, it cannot do so simultaneously with the introduction of the quantity of heat into the medium flow and can only do so once the medium has cooled. However, if the medium temperature changes during this time interval, a measured error occurs. Such a short-term change is, however, comparatively rare.

It is advantageous if the control and/or regulation unit is designed to control the cycle duration of the energy supplied and/or the amount of energy supplied on the basis of at least one process variable selected from a group comprising the flow rate of the medium, the mass flow of the medium, the supply voltage supplied to the flowmeter and/or medium-specific properties, particularly the composition of the medium, the density and/or the thermal capacity of the medium. Using these parameters it is possible to control how much energy is released within a specific amount of time. Understandably, energy input that lasts longer but is comparatively low permits a longer measuring time and therefore more reliable results. However when forming a temperature profile it can happen that a comparatively high amount of energy must initially be input into the medium in order to obtain reliable results at all. In this case, the measuring time is shorter as the energy reservoir available is used up more quickly.

The flowmeter can advantageously have a connection to connect to a two-wire current loop of a field device and be operable via this, preferably exclusively via this. Thanks to the energy-saving operation of the thermal flowmeter, it can be used in two-wire technology, particularly in explosive areas.

Here, the flowmeter can advantageously be operated with a power as low as 43 mW within a variation range of 1 mW.

Common thermal flowmeters usually have sensor elements with heaters which mainly heat and only briefly interrupt heating in order to determine a temperature of the sensor element. Typical cycle ratios of heating to temperature measurement are 95:5. Sensors with sensor elements that are heated alternately are also known. However, with longer heating periods the sensor known up to now also introduces heat into the medium regardless of the sensor element that is being heated. In the present thermal flowmeter, the sensor only introduces heat for a very short time due to the brief input of energy. In the breaks in heating which are considerably longer by comparison, the temperature of the medium and of the sensor element being heated is measured. The ratio $t_0:t_1$ is preferably between 2:1 to 40:1, particularly 5:1 to 25:1. Alternate heating operation of the sensor elements can also be used with the thermal flowmeter according to the invention.

A procedure to determine and/or monitor a mass flow of a medium through a measuring tube with the thermal flowmeter, which consists of the sensor with at least the first heatable sensor element and the energy storage element to supply power to the sensor element, comprises the following steps:

The storage by the energy storage element of energy fed in and the release of an amount of energy to the sensor element over a time frame, wherein the amount of energy released is larger than the amount of energy fed in during this time frame.

With this procedure, energy-saving thermal flowmeter operation can be implemented Up to now, thermal flowmeters have been typically operated with a power of over 500 mW due to the practically constant heating mode. With the new mode of operation, the flowmeter can be operated with a power which is fed in during the time frame and can be as low as roughly 43 mW.

It is advantageous if the amount of energy given off to the sensor element can be controlled as follows:

A Introduction of a first quantity of heat into a flowing medium by the active sensor element, said first quantity of heat depending on a first amount of energy given off;

B Determination of a first mass flow value or a variable proportional to this according to the principle of thermal flow measurement, and C Modification of the amount of energy released depending on the first mass flow value determined or a variable proportional to this.

Thereby optimized energy management during operation, can be worked out.

The energy storage element has a finite amount of energy, wherein a first part of the energy of the energy storage element is used to operate the sensor element and the remaining surplus part of the energy is preferably completely used to operate the flowmeter. As a result, for example, more energy can be supplied to a display and evaluation unit to make the measured values visible.

Once the quantity of heat has been introduced, the temperature of the sensor element can be measured. This is used to track the temperature drop of the sensor element during temperature measurement to autocalibrate the flowmeter.

The thermal flowmeter can be calibrated according to a procedure that comprises the following steps:
A Preparation of the thermal flowmeter;
B Determination of a temperature characteristic curve at variable resistance values
C Determination of a characteristic curve of the power coefficient at variable flow rates.

The thermal flowmeter is used to determine the mass flow of a medium in industrial process measuring technology and automation. While flow sensors are known in the automotive industry to measure the flow of exhaust gas, these do not fall within the scope of the aforementioned area of application.

The thermal flowmeter is used, in particular, as a two-wire measuring device.

The invention claimed is:

1. A thermal flowmeter for determining and/or monitoring a thermal mass flow of a medium through a measuring tube, comprising:
   a thin-film sensor, comprising:
   at least a first substrate layer made of electrically non-conductive material:
   a resistance layer made of electrically conductive material; and
   a cover layer to protect said resistance layer against abrasion, wherein:
   said resistance layer comprises two sensor elements, wherein at least a first of the two sensor elements embodied as a heatable sensor element to introduce a heat quantity into a medium, and at least a second of the two sensor elements is designed to determine the temperature of the medium;
   a gap that isolates the two sensor elements from one another; and
   said thermal flowmeter has an energy storage element and a control and/or regulation unit for a clocked supply of power to said heatable sensor element in such a way that through said thin-film sensor:
   i) a heat quantity is introduced into the medium at intervals by giving off a specific amount of electrical energy to said active sensor element, with interval pauses in which no heat quantity is introduced into the medium and heating intervals in which quantities of heat are introduced into the medium wherein said introduced heat quantity is controlled by modifying said specific amount of energy given off to said active sensor element, from said energy storage element, depending on a mass flow value determined beforehand or a variable proportional to the determined mass flow value, and
   ii) said interval pauses last longer than said heating intervals, wherein:
   the ratio of the length of the interval pauses to the length of the heating intervals is between 2 to 1 and 40 to 1.

2. The thermal flowmeter as claimed in claim 1, wherein:
said cover layer of said thin-film sensor has a layer thickness between 0.1 μm-20 μm.

3. The thermal flowmeter as claimed in claim 1, wherein:
said gap of said thin-film sensor has a gap width of at least 50 μm to 500 μm.

4. The thermal flowmeter as claimed in claim 3, wherein:
said gap of said thin-film sensor has a gap width of at least 1%, particularly at least 5% of the total width of the thin-film sensor.

5. The thermal flowmeter as claimed in claim 1, wherein:
the gap depth of said gap of said thin-film sensor is between 70% and 120% of the total length of one of said sensor elements, but less than 90%, of the total length of said thin-film sensor.

6. The thermal flowmeter as claimed in claim 5, wherein:
the gap depth of said gap of said thin-film sensor is less than 80% of the total length of said thin-film sensor, particularly of the total length of said second layer.

7. The thermal flowmeter as claimed in claim 1, wherein:
said sensor elements of said thin-film sensor comprise a loop, wherein the resistance value of said sensor elements is adjustable by trimming of the loop.

8. The thermal flowmeter as claimed in claim 1, wherein:
said thin-film sensor has an essentially mirror symmetrical shape; and
the mirror plane runs along a central axis of said gap.

9. The thermal flowmeter as claimed in claim 1, wherein:
said thin-film sensor is enclosed in a base, preferably a ceramic base, for arrangement on or in a housing of the thermal flowmeter.

10. The thermal flowmeter as claimed in claim 9, further comprising:
a connection layer, preferably made of enamel, arranged between said base and said thin-film sensor.

11. The thermal flowmeter as claimed in claim 9, further comprising:
wires integrated in said base to supply power to said thin-film sensor and/or for the signal transmission of values measured by said thin-film sensor.

12. The thermal flowmeter as claimed in claim 9, further comprising:
a connection layer arranged between said base and said housing for the leak-tight connection between said base and said housing.

13. The thermal flowmeter as claimed in claim 9, wherein:
said base is arranged in said housing in a detachable axial locking mechanism.

14. The thermal flowmeter as claimed in claim 1, wherein:
said energy storage element is embodied to save power fed in said energy storage element and embodied to release an energy amount to said heatable sensor element over a time frame; and
the energy amount released is larger than the amount of energy fed in during said time frame.

15. The thermal flowmeter, as claimed in claim 1, wherein said thermal flowmeter is embodied as a two-wire measuring device.

* * * * *